United States Patent [19]

Darnall, Jr.

[11] Patent Number: 4,458,347
[45] Date of Patent: Jul. 3, 1984

[54] RECORD CENTERING AND DECOUPLING DEVICES FOR TURNTABLES

[76] Inventor: Thomas A. Darnall, Jr., Rte. 6, Box 404, Buekhannon, W. Va. 26201

[21] Appl. No.: 416,036

[22] Filed: Sep. 8, 1982

Related U.S. Application Data

[60] Continuation-in-part of Ser. No. 148,292, May 9, 1980, Pat. No. 4,368,530, which is a division of Ser. No. 904,788, May 11, 1978, Pat. No. 4,202,551.

[51] Int. Cl.³ ................................................ G11B 3/62
[52] U.S. Cl. .................................................... 369/270
[58] Field of Search ......................... 369/263, 270, 271

[56] References Cited

U.S. PATENT DOCUMENTS 1,471,092 10/1923 Blaha .................................... 369/270
3,395,919 8/1968 Freier ................................... 369/270

FOREIGN PATENT DOCUMENTS 2123553 11/1972 Fed. Rep. of Germany ...... 369/270
252124 11/1926 United Kingdom ................ 369/270
580574 11/1977 U.S.S.R. .............................. 369/271
860116 8/1981 U.S.S.R. .............................. 369/263

Primary Examiner—Charles E. Phillips
Attorney, Agent, or Firm—Depaoli & O'Brien

[57] ABSTRACT

Methods and devices are provided for accurately centering a record upon the platter of a turntable before play thereof and for isolating the record from the spindle of the turntable while the record is being played, in order to decouple the tonearm from mechanical and acoustical vibrations travelling up the spindle and to the circular side of the record aperture and then to the needle of the tonearm. These devices are used with a stub-like spindle having a top below the upper surface of the platter and include a removable centering pin, a shrink-swell centering and detaching device, and a double-diameter centering and detaching device.

1 Claim, 3 Drawing Figures

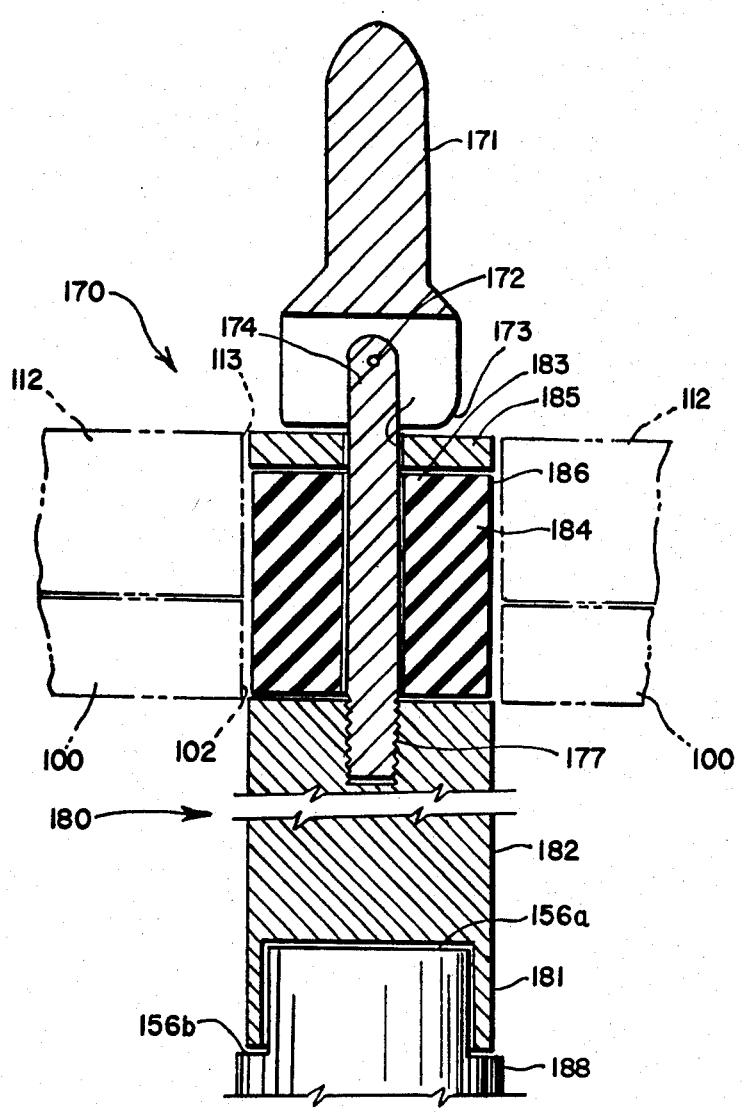

RECORD CENTERING AND DECOUPLING DEVICES FOR TURNTABLES

CROSS REFERENCE TO RELATED APPLICATIONS

This application is a continuation-in-part of Ser. No. 148,292, filed May 9, 1980, now U.S. Pat. No. 4,368,530, which is a divisional application of Ser. No. 904,788, 5-11-78 now U.S. Pat. No. 4,202,551, issued May 13, 1980, entitled "ACOUSTIC DAMPENING ASSEMBLY FOR RECORD PLAYER TURNTABLE" of Tom A. Darnall, Jr.

BACKGROUND OF THE INVENTION

1. Field of the Invention

This invention relates to record player turntables and particularly relates to devices for dampening, dissipating, and blocking vibrations and resonances that interfere with faithful sound reproduction. It especially relates to devices for centering a record on the platter and then isolating the record from the turntable drive mechanism while the record is being played in order to block such vibrations travelling through the drive mechanism.

2. Review of the Prior Art

Playback distortion from the turntable frequently occurs in even the finest equipment. It may be an obvious distortion which makes listening very unpleasant, an objectionable resonant coloration, a blurring of clear, distinct sound into an unrecognizable mass of sound, a subtly annoying but not totally unpleasant effect, or even an unidentifiable source of fatigue. Mechanical vibration in a turntable may originate in, or be transmitted by, the drive system, the loader assembly, the platter design, or the chassis design.

Feedback is a major source of mechanical vibration which may be either mechanical or acoustical. Mechanical feedback is energy transmitted through the floorboards and to the wall beams and the like so that the loudspeaker is mechanically coupled to the turntable. Acoustical feedback is created by acoustical energy emanating from the loudspeaker or other sources when it moves or pumps energy into the room in the form of low-to-high level pressures at multiple frequencies and in complex patterns and with changing forces. A mechanical force is thus created when the pressure patterns in the air are absorbed by solid objects.

The lower the frequency, the more obvious the mechanical force becomes until it reaches a frequency too low to be heard. But even at such low frequencies, sufficient energy can be absorbed to rattle windows and shake walls as well as to create mechanical energy in the turntable platter, it main board, its base, and its supporting structure. Each of these parts vibrates with its own characteristic resonances in accordance with varying amounts of acoustical energy in the room.

These mechanical and acoustical vibrations travel through the equipment and coincide from all directions at certain key pathways to the tone arm. The result of such combinations seems to be a compounded increase in the feedback to the tone arm at many key points which might be called "collision course vibrations". These collision course vibrations are also generated within the mechanism itself, by and between the motor and the main bearing and the chassis and the subchassis, and are transmitted to and picked up by each end of the tone arm.

Such vibrations are commonly measured in the laboratory as rumble. Rumble is a low-pitched vibration or frequency that is caused by a mechanical vibration acting on the turntable and tone arm when the vibration occurs at the rotation frequency of the motor, the idler, the bearing, or the platter, or at some multiple of any of these frequencies. The platter bearing is indeed the main source of rumble in turntables that are now available on the market. Rumble may be reported as weighted or unweighted. Weighted rumble measurements discriminate against subsonic frequency components which cannot be reproduced by loudspeakers or heard by the human ear, but such frequencies can overdrive an amplifier or speaker and thereby impair the reproduction of higher frequencies. Thus, an unweighted measurement can also provide useful information because both sonic and subsonic frequencies—from one to 100,000 cps—contribute undesirable side effects.

Flutter is a rapid pitch fluctuation in reproduced music which is caused by pulsations or changes of the turntable speed, i.e., a rapid variation from constant rotational speed. When flutter occurs at a low rate, it is called "wow", suggesting the characteristic sound it imparts to steady musical tones. When it occurs at higher rates, the effect is of a "gargling" or roughness. Wow and flutter are usually reported as a combined flutter measurement which is weighted to emphasize the most objectionable flutter rates at around 5–10 Hz. This combined flutter measurement is usually specified in hundredths of a percent of perfect accuracy with 0.03% being a typically good figure.

Flutter robs a musical instrument of its character by blurring the musical image. Flutter can be characterized as forward and backward movement. The composite of all of these vibrations creates a situation that has much the same distortional effect, with respect to playback, as flutter itself but with more severe characteristics because these vibrations react in all planes and in 360°.

Even though such laboratory measurements report excellent values, such as an average peak wow and flutter of not more than ±0.03% and a rumble low enough to produce an ARLL-weighted measurement of −73 db or even −80 db, collision course vibrations can produce annoying disturbances to the trained ear. Neither is consequently acceptable for quality equipment.

Numerous devices have been designed and built for decoupling the turntable from mechanical vibrations. However, the frequency at which the energy decoupler resonates must be above the rotational speed of the turntable, which at 33⅓ rpm is approximately one-half cycle per second, and, at the same time, must be lower than the resonant frequency of the tone arm mass and cartridge compliance, which is preferably 8 or 9 cycles per second. Thus, the best frequency for decoupling mechanical energy to the turntable is two or three cyles per second. Such decouplers include the use of a dense, thick, massive support board, upon which the turntable is placed, and the use of a number of coil springs between the support board and the platform therebeneath. Adding additional mass to the frame of the turntable also changes its frequency of vibration and reduces distortion that may range from frizzy highs to muddy lows, e.g., that is, music "out of focus".

About twenty-four years ago, a turntable having excellent acoustical qualities is believed to have been advertised. This turntable featured a centering pin that expanded for precisely centering a record and remained in place during play.

U.S. Pat. No. 1,821,916 describes a resilient center for phonograph records which is a laminated structure comprising the record body and a relatively thin rubber layer with a pin opening therein which is substantially coincident with the central axis of the record.

U.S. Pat. No. 3,801,476 relates to accurately centering a centering core clamped around a lacquer foil original recording for the manufacture of record discs containing sound or video recordings. It provides a centering sleeve which closely fits both the spindle and the outer edge of the centering core, whereby any possible misalignment of the foil with reference to the spindle is avoided.

However, these arrangements do not effectively decouple the mechanism of the turntable from the center hole of a record. There is accordingly a need for a simple, generally applicable and efficient decoupler for collision course vibrations travelling from the motor or other parts of the mechanism and up the spindle towards the center hole of the record and then to the needle carried by the tonearm.

SUMMARY OF THE INVENTION

It is an object of this invention to provide an efficient decoupler for collision course vibrations between the turntable mechanism and the record in a wide variety of turntables and over a wide range of frequencies.

It is also an object to provide a method for decoupling the turntable mechanism from contact with the record during play thereof.

It is specifically an object to provide a means for centering a record before play and then for detaching the spindle from the record while the record is being played.

This decoupler is in the form of a record centering means which comprises a centering pin having a means for effecting firm contact of the peripheral surface of the pin with the edge of the center hole of the record while loading the record onto the platter and a means for spacing the peripheral pin surface from the center hole edge during play of the record.

The decoupler consequently isolates, blocks, and decouples all collision course vibrations and prevents synergistic combinations thereof. In addition, the top of the spindle is displaced so that it is below the center hole of the record. As a result, the collision course vibrations and resonances within the turntable mechanism are not transmitted to the record and thence to the tone arm. Thus, the degree of wow, flutter, and rumble, as generally measured in the laboratory, and additional vibrations that are subtly picked up by the stylus and then amplified, are at least minimized in a turntable equipped therewith. Indeed, the type of flutter that is eliminated by this invention is believed never to have been measured in a laboratory, for it involves 360° in all planes of flutter.

The invention is used with a turntable comprising a rotational mechanism, a platter which supports a record being played thereon, and a spindle which is connected to the mechanism, the spindle being stub-like and having a top which is below the upper surface of the platter. In combination with the stub-like spindle, the invention comprises:

A. a means for centering a record in relation to the spindle;
B. a means for selectively and coaxially attaching the centering means to the spindle; and
C. a means for selectively decoupling the centering means from the record during play thereof.

The invention may take any of the following three forms, for example:

A. a removable centering pin;
B. a shrink-swell centering and detaching device; and
C. a multi-diameter centering and detaching device.

The removable centering pin comprises:

A. a centering shaft, having a diameter equal to the diameter of the center hole of a record, which is coaxially aligned with the stub-like spindle and is disposed above the top of the spindle; and
B. a centering and attaching means which permits the shaft to be easily and quickly removed from the spindle after the record has been centered and before it is played.

The centering and attaching means may comprise a slender post that is threaded at one end so that it is rotatively insertable into a threaded central hole in the top of the stub-like spindle, whereby the post is coaxially aligned with the spindle. The centering shaft may therefore be in the form of a cylindrical member, having an outer diameter equal to the diameter of the center hole of the record and an inner diameter equal to the diameter of the centering shaft. The cylindrical member may be in the form of a cylindrical collar or an elongated cup which is inverted and slipped over the post. The length of the collar or cup must be sufficient that its upper end will protrude sufficiently far above the record and, if used, a ballast placed thereupon, that the upper end can be readily grasped between a thumb and a forefinger for removal of the collar or inverted cup before the record is played, whereby the top of the spindle is decoupled from the centered record.

Instead of threadedly attaching a separate post to the stub-like spindle, a standard spindle may be turned on a small lathe to remove the cylindrical outer part of its upper portion and leave an elongated core as a coaxially aligned slender post. A suitable collar or inverted cup may then, of course, be placed over this post.

Unfortunately, however, such a slender post may be readily damaged, requiring replacement of the entire spindle. An alternative and preferred form for an attachment means, therefore, is a tube which fits around the upper portion of the stub-like top of the spindle, is rigidly attached thereto, and protrudes sufficiently far thereabove that the centering shaft may be lowered into the tube and onto the top of the spindle at any time, such as before or after a record is placed upon the platter. The collar or cup is carefully raised from the tube and through the center hole of the record after the record has been centered.

The shrink-swell centering and detaching device, having a swell position and a shrink position, is mounted on the spindle to provide precise centering of the record while in its swell position and is spaced from the aperture edge of the record while in its shrink position, whereby the record is detached from the spindle to provide decoupling during play. The shrink-swell centering and detaching device suitably comprises:

A. a slender central post or shaft that is coaxially aligned with and disposed above the top of the stub-like spindle;
B. an elastomeric collar that is disposed around the post and has a cylindrical side which is radially spaced from the cylindrical side of the center hole of the record while the device is in its shrink position; and C. a compression means for axially squeezing the collar, thereby bowing its cylindrical side outwardly to press against the cylindrical side of the center hole and center the record while the device is in its swell position.

The shrink-swell centering and detaching device comprises attached-post embodiments and a self-contained embodiment. In the attached-post embodiments, the post may be rigidly and coaxially attached to the top of the stub-like spindle, such as by rotatively inserting the threaded lower end of the shaft into a threaded central hole in the top of the stub-like spindle. Alternatively, the post may be pressure fitted into a central hole, or the upper portion of the original spindle may be turned on a lathe to form the post. In these embodiments, the elastomeric collar rests upon the top of the spindle which is preferably slightly below the bottom of the record, such as ⅛ inch.

The compression means may comprise:
A. a rigid washer, disposed on top of the collar and having an inner diameter slightly larger than the diameter of the post and of sufficient thickness that it moves up and down thereon without skewing;
B. a pivot pin which is disposed in the upper end of the post and aligned transversely thereto;
C. a pivotable lever, attached to the post with the pivot pin, and having a fulcrum portion which bears against the top of the washer and pushes it downwardly along the post when the lever is pivoted, thereby axially compressing the collar.

Another suitable embodiment of the compression means is a pawl device, slideably mounted on the post above the collar, which can be pushed down by thumb pressure for axially compressing the collar and which can be released by sidewise pressure upon one or more spring-based pawls which engage the surface of the post and hold the pawl device at the selected elevation. The post is preferably serrated or toothed. A washer may be interposed between the top of the collar and the bottom of the pawl device.

The self-contained embodiment comprises a centering member that fits over a stub-like spindle having a circular circular shoulder below its top. The centering member has an interior well within which a disc slideably fits, a cavity surrounded by thin flexible slats within which the elastomeric collar fits, and a rigid top portion having a central opening. The slats are attached along its cylindrical outer sides of the top portion and the bottom portion. A fulcrum-bearing lever, as the pressure member, is pivotally mounted at the upper end of a shaft which is axially movable through the central openings of the top portion and of the elastomeric collar and is rigidly attached to the disc at its lower end, whereby pivoting the lever pulls the disc upwardly, compressing the collar between it and the top portion and bowing the slats outwardly until they press against the cylindrical aperture side of the record. The top of the stub-like spindle is well below the top of the platter and the bottom of the record. The bottom portion has a bottom opening which is adapted to fit over the top of the stub-like spindle. As a variation of the attached-post embodiment of the shrink-swell centering and detaching device, the central post, which is attached to the lever and passes through the rigid washer and elastomeric collar, may be threadedly and coaxially attached to the bottom portion of the centering member of the self-contained embodiment, whereby the slats are not needed because the collar is pushed downwardly instead of being pulled upwardly.

The self-contained embodiment with a pivoted lever as compression means more specifically comprises:
A. a centering member, comprising:
(1) an elongated pin, having:
(a) a bottom opening which is adapted to fit onto the spindle,
(b) a flat top,
(c) a threaded central recess;
B. an elastomeric collar, having a central opening, which is mounted upon the flat top;
C. a rigid washer, having a central opening, which is mounted atop the collar;
D. a pressure member, comprising:
(1) a lever having a handle and a base, the base being provided with a bottom, a fulcrum edge, a slot traversing the bottom, and pivot holes which are disposed across the slot and are closer to the bottom than to the fulcrum edge,
(2) pivot pin which is disposed within the pivot holes, and
(3) a shaft, which is pivotably attached at one end to the pivot pin and is rigidly attached at its other end by being threadedly inserted into the central recess, the shaft having a diameter approximately equalling the diameters of the central openings, whereby:
(a) pivoting the lever compresses the fulcrum edge against the washer and squeezes the elastomeric collar to provide contact with the circular side of the aperture and create precise centering of the record, and
(b) returning the lever to its upright position completely detaches the collar from the circular side of the aperture.

The self-contained embodiment of the shrink-swell centering and detaching device specifically comprises:
A. a centering member, comprising:
(1) an elongated pin, having:
(a) a bottom opening which is adapted to fit onto the spindle,
(b) a well having a cylindrical side within which a disc slides,
(c) a cavity having a thin cylindrical side that is longitudinally slitted to provide a large number of flexible slats which are disposed to be within the aperture of the record being centered, the cavity being of greater diameter than the well and adjacent thereto to provide a circular shoulder along the bottom edge of the cavity, and
(d) a top portion having a central opening, and
(2) an elastomeric collar having a central opening which fits snugly within the cavity, inside of the cylindrical side and between the circular shoulder and the top portion; and
B. a pressure member, comprising:
(1) a lever having a handle and a base, the base being provided with a bottom, a fulcrum edge, a slot traversing the bottom, and pivot holes which are disposed across the slot and are closer to the bottom than to the fulcrum edge,
(2) a pivot pin which is disposed within the pivot holes, and
(3) a piston, comprising a shaft, which is pivotably attached at one end to the pivot pin, and the disc which is transversely disposed and rigidly attached to the shaft at its other end, the shaft having a diameter approximately equalling the diameters of the central openings and a length that enables the disc to be within the well and adjacent to the bottom end of the collar when the base rests upon the top portion; whereby:

(a) pivoting the lever compresses the fulcrum edge against the top portion, moves the disc upwardly and squeezes the elastomeric collar, and bows the slats outwardly in a uniform arc to provide contact with the circular side of the aperture and create precise centering of the record, and (b) returning the lever to its upright position completely detaches the slats from the circular side of the aperture.

The bottom opening has a circular edge which rests upon a circular shoulder of the stub-like spindle. The shaft moves slideably within the central openings of the top portion and the elastomeric collar. The multi-diameter centering and detaching device may contain three or more stages or circular steps of differing diameter. However, this device is preferably a doublediameter centering and detaching device which comprises:

A. a tube having a circular side, with a curved slot therein and within which the top of the stub-like spindle fits; and B. a pin member comprising:
(1) a bottom portion which fits slideably within the tube and has a radially protruding lug which is adapted to move within the slot,
(2) a smaller-diameter portion which is coaxially attached to the bottom portion,
(3) a larger-diameter portion, which is coaxially attached to the smaller-diameter portion and fits closely within the center hole of the record, and
(4) a handle which is attached to the larger-diameter portion and protrudes above the record while the device is in both its load and play positions.

The slot is preferably L-shaped, one part being vertical and the other part being transverse to the tube. The tube and the portions of the pin member are coaxially aligned. The vertical length of the smaller-diameter portion is sufficient to accommodate the thickness of a record and of any centering device placed thereupon.

Alternatively, a tapered centering pin can be attached to the stub-like spindle top, whereby the record and the pin are in peripheral contact, and the entire platter assembly and record can then be raised just before playing the record in order to isolate the circular aperture edge of the record from the tapered centering pin while the record is in play.

The method of this invention for decoupling a record from mechanical and acoustical vibrations travelling up the spindle of the turntable mechanism is primarily based upon isolating the record from the spindle while the record is being played. This method particularly includes centering a record on a motor-operated turntable and then decoupling the record from the motor during play of the record. When the turntable has an axially disposed spindle and the record has a central aperture with a circular side, the method comprises:

A. connecting the spindle and the circular side before the play begins, whereby the record and the spindle are co-axially aligned; and B. disconnecting the spindle and the circular side before play of the record is commenced, whereby the spindle and the circular side are spatially separated.

The method further comprises isolating the record from the spindle of the turntable by:

A. providing the spindle with a stubby top which is below the top surface of the platter;

B. precisely centering the record upon the platter with a centering device which temporarily performs as the spindle; and C. removing the centering device from contact with the circular side of the record aperture before the record is played.

The method still further comprises disconnecting the spindle and the circular side of the record aperture by any suitable method, such as:

A. placing a removable centering device upon the stubby spindle top and removing it after centering the record and before play thereof;

B. using a centering device which is capable of selectively expanding or swelling to contact the circular side of the record aperture, without removal from the spindle; and C. using a centering device having portions of differing diameters and capable of being raised or lowered without being removed from the spindle, so that a larger-diameter portion can initially contact and center the record and a smaller-diameter portion can be within the aperture but out of contact therewith during play of the record.

BRIEF DESCRIPTION OF THE DRAWINGS

FIG. 2 is a sectional elevation of another embodiment of the shrink-swell centering and detaching device.

DESCRIPTION OF THE PREFERRED EMBODIMENTS

When a record is placed on a mat of a turntable platter, its outer edge should coincide with the outer edge of the platter and the edge of its aperture or center hole should coincide with or be inside of the aperture edges of the platter and mat. However, to obtain precise centering and subsequently to decouple the platter from the spindle, it is an essential part of this invention to use a centering device which will enable the record to be centered and then to be detached from all contact with the spindle or shaft of the turntable.

Such centering and detachment can be done with any of three devices, for example. Firstly, a removable, centering pin can be inserted and then removed before the record is played. Secondly, a shrink-swell centering and detaching device can be mounted on the spindle to provide precise centering in its swell position, as indicated in phantom on the right side in FIG. 1, and to be spaced from the aperture edge in its shrink position while remaining in place during play. Thirdly, a double-diameter centering and detaching device can be mounted on the spindle for loading and centering while in its raised position and for detached play while in its lowered position, or vice versa.

Figure 1:
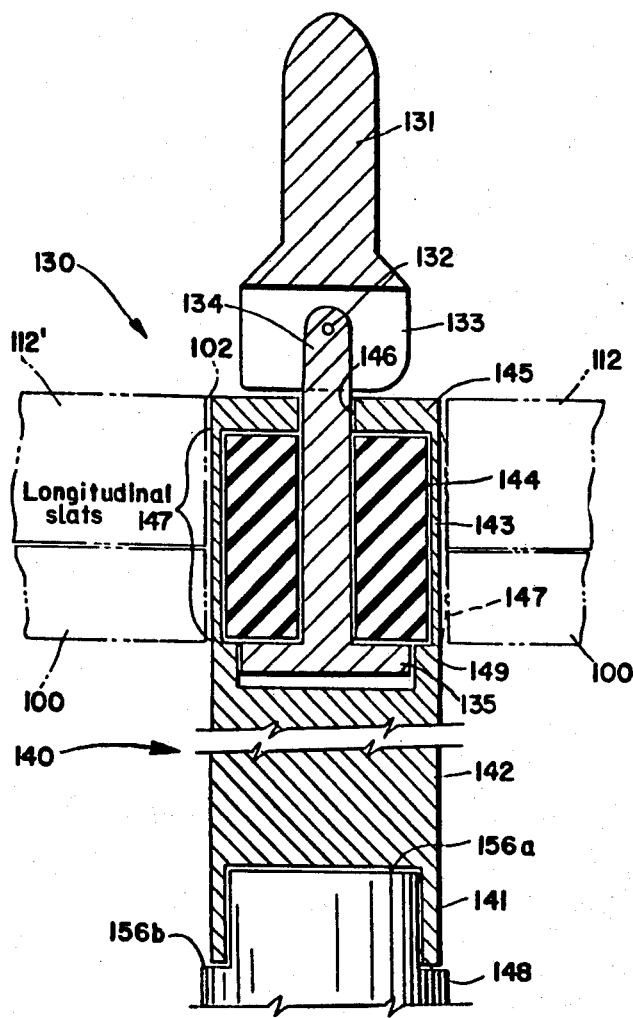
FIG. 1 is a sectional elevation of a shrink-swell centering and detaching device, mounted upon a stub-like spindle of a turntable and in loading position with a record and ballast in phantom.

As indicated in FIG. 1, one embodiment of the shrink-swell centering and detaching device comprises a pressure member 130 and a centering member 140. The former comprises a lever 131, a pivot pin 132 that is transversely disposed across a slot having sides 133, and a piston comprising a shaft 134 which is pivotably attached to pin 132 at one end and is rigidly attached to a transversely disposed disc 135 at its other end. The centering member 140 comprises an elongated pin having a cylindrical bottom opening with circular side 141, a solid portion 142, a well with circular sides 149 within which disc 135 slides, a cavity having a thin circular side 143, and a top portion 145 having a central opening with sides 146 within which shaft 134 moves. Circular side 143 is longitudinally slitted to provide a large number of flexible slats 147.

An elastomeric collar 144 fits snugly within the cavity inside of circular side 143. Edge 148 of circular side 141 rests against a circular shoulder 156b in the spindle or shaft 156a of the turntable. When a record 100 and a ballast comprising a lead disc 112 with a center hole therein are loaded onto the turntable, the aperture edge 102 of the record is spaced from slitted circular side 143, as indicated at the left side of centering member 140 in FIG. 1. When lever 131 is pivoted and disc 135 presses against collar 144, slats 149 are bowed outwardly in a uniform arc to press against circular side 102 and corresponding side 113 of the hole in the lead weight 112, as indicated at the right side of centering member 140 in FIG. 1, so that precise centering is accomplished. When lever 131 is returned to its upright position, the circular side 143 is again completely detached from record 100 and ballast 112.

As indicated in FIG. 2, another embodiment of the shrink-swell centering and detaching device comprises a pressure member 170 and a centering member 180. Pressure member 170 comprises a lever 171, a pivot pin 172 that is transversely disposed across a slot having sides 173, and a post 174 having a threaded lower end 177. Centering member 180 comprises an elongated pin having a cylindrical bottom opening with circular side 181, a solid portion 182, a top 183, and a central well having threaded sides into which threaded lower end 137 is rotatively inserted.

Figure 3:
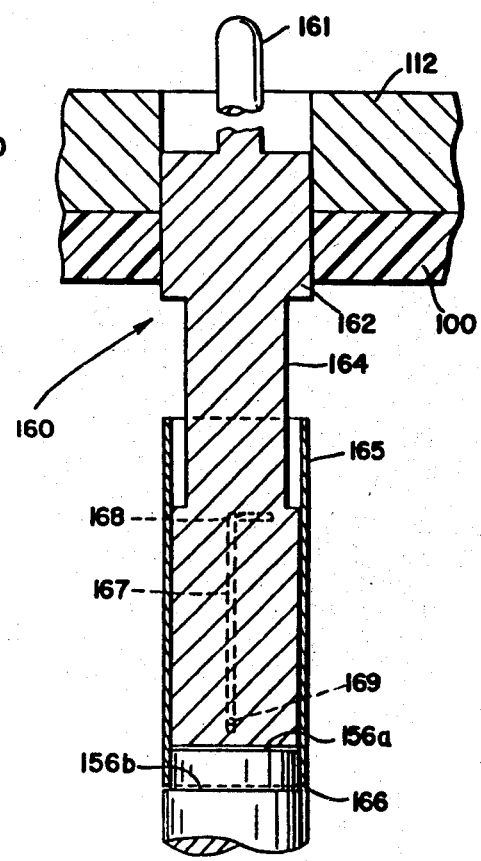
FIG. 3 is a sectional elevation of a doublediameter centering and detaching device, also mounted upon a stub-like spindle of a turntable and in centering position with a record and ballast.

An elastomeric collar 184 is disposed around post 174 and rests on top 183 of the pin. A rigid washer 185 having a central hole with side 187, rests atop collar 184. Bottom edge 188 of circular side 181 rests against a circular shoulder 156b in the spindle 156a of the turntable. When a record 100 and a ballast comprising a lead disc 112 with a center hole therein are loaded onto the turntable, aperture side 102 of the record is spaced from side 186 of collar 184, as indicated in FIG. 3. When lever 171 is pivoted and its twin fulcrum portions 173 press against washer 185, collar 184 is axially compressed so that side 186 is bowed outwardly against aperture side 102 and corresponding side 113 of the hole in lead weight 112, so that precise centering is accomplished.

If lever 171 continues to be depressed while record 100 is in play, side 102 remains in contact with elastomeric side 186, so that record 100 is thereby isolated from resonance travelling up the spindle. However, for optimum effectiveness, it is preferred that lever 171 be returned to its vertical position so that an annular space is provided between side 186 and sides 102 and 113 while record 100 is being played.

The double-diameter centering and detaching device 160, as seen in FIG. 3, comprises:

A. a tube having a circular side 165, within which the top portion of a stubby spindle or shaft 156a fits, and B. a pin member having a bottom portion which fits slideably within the tube, a radially protruding lug 169 which is attached to the bottom portion, a smaller diameter portion 164 which is attached to the bottom portion, a larger-diameter portion 162 which is attached to portion 164, and a handle 161 of much smaller diameter which is attached to portion 162.

Bottom edge 166 of circular side 165 rests against a circular shoulder 156b in the spindle. An L-shaped slot in side 165, formed by a longitudinal portion 167 and a transverse portion 168, receives lug 169. When device 160 is in its lowered position for loading and centering, lug 169 is in the longitudinal portion 167, as indicated in phantom in FIG. 10. When device 160 is in its raised position for playing, lug 169 is in transverse portion 168, near the top of the L-shaped slot, and larger diameter portion 162 is above lead disc 112 and thus completely detached and spaced from record 100 and lead disc 112.

It is clearly also satisfactory to construct device 160 so that lug 169 is in transverse portion 168 while loading and in the bottom of longitudinal portion 167 while playing so that larger diameter portion 162 is beneath record 100 and is thus completely detached therefrom and from disc 112 while record 100 is playing. However, the construction shown in FIG. 3 is preferred because it enables a record to be more accurately centered.

In combination with the depressed elevation of the stub-like shaft or spindle 156a, any of these three centering and detaching devices is effective for decoupling the drive mechanism from the record, but the shrink-swell embodiment is preferred, and the double-diameter embodiment is highly preferred because either of the preferred devices is less readily lost or misplaced than the removable centering pin.

It is a critical feature of this invention that the center hole of a record should never contact the metal side of the spindle during play. In other words, side 102 of the hole in record 100 must not touch the side of shaft 156 during play of the record, and maintaining an annular space therebetween is highly preferred. It is also a part of this invention to attain such isolation by grinding down shaft 156 of an existing turntable to a stubby top 156a that is below the hole in record 100.

Because innumerable modifications of the preferred embodiments discussed hereinbefore can be made without departing from the principles of this invention, what should be interpreted as the scope of the invention is defined by the following claims.

What is claimed is:

1. In a turntable comprising a rotational mechanism, a platter which supports a record being played thereon, and a spindle which is connected to said mechanism, said spindle being stub-like and having a top which is below the upper surface of said platter, a record centering and decoupling device comprising:

A. a means for centering a record in relation to said spindle;

B. means for selectively and coaxially attaching said centering means to said spindle; and C. a means for selectively decoupling said centering means from said record during play thereof, wherein said centering means, said attaching means, and said decoupling means are, in combination, a double-diameter centering and detaching device which comprises:

1. a tube having a circular side, with a curved slot therein and within which the top of said stub-like spindle fits; and
2. a pin member, comprising:
   a. a bottom portion which fits slideably within said tube and has a radially protruding lug which is adapted to move within said slot,
   b. a smaller-diameter portion which is coaxially attached to said bottom portion,
   c. a larger-diameter portion, which is coaxially attached to said smaller-diameter portion and fits closely within the center hole of said record, and
   d. a handle which is attached to said larger-diameter portion and protrudes above said record while said device is in both its load and play positions.

* * * * *